(12) United States Patent
Anderson et al.

(10) Patent No.: US 12,502,824 B2
(45) Date of Patent: Dec. 23, 2025

(54) NON-ORTHOGONAL ADDITIVE MANUFACTURING AND THE TREATMENT OF PARTS MANUFACTURED THEREOF

(71) Applicant: University of Maine System Board of Trustees, Orono, ME (US)

(72) Inventors: James M. Anderson, Milbridge, ME (US); Matthew J. Ireland, Old Town, ME (US)

(73) Assignee: University of Maine System Board of Trustees, Orono, ME (US)

( * ) Notice: Subject to any disclaimer, the term of this patent is extended or adjusted under 35 U.S.C. 154(b) by 0 days.

(21) Appl. No.: 18/770,966

(22) Filed: Jul. 12, 2024

(65) Prior Publication Data

US 2024/0359396 A1 Oct. 31, 2024

Related U.S. Application Data

(62) Division of application No. 17/262,275, filed as application No. PCT/US2019/045277 on Aug. 6, 2019, now abandoned.

(Continued)

(51) Int. Cl.
*B29C 64/106* (2017.01)
*B29C 64/182* (2017.01)
(Continued)

(52) U.S. Cl.
CPC .......... *B29C 64/106* (2017.08); *B29C 64/209* (2017.08); *B29C 64/241* (2017.08);
(Continued)

(58) Field of Classification Search
CPC ......... B29C 64/00; B33Y 50/00; B33Y 50/02; B33Y 10/00; B33Y 30/00
See application file for complete search history.

(56) References Cited

U.S. PATENT DOCUMENTS 5,257,657 A * 11/1993 Gore ..................... B29C 64/112
164/94
5,269,982 A 12/1993 Brotz
(Continued)

FOREIGN PATENT DOCUMENTS

| KR | 2017/0015442 A | 2/2017 |
|---|---|---|
| WO | WO-2018/039260 A1 | 3/2018 |
| WO | WO-2020/033386 A1 | 2/2020 |

OTHER PUBLICATIONS

International Search Report for PCT/US2019/045277 (Non-Orthogonal Additive Manufacturing and the Treatment of Parts Manufactured Thereof, filed Aug. 6, 2019), issued by ISA/US, 3 pages (Oct. 11, 2019).

(Continued)

*Primary Examiner* — Joseph S Del Sole
(74) *Attorney, Agent, or Firm* — Choate, Hall & Stewart LLP; Brian E. Reese; Samuel R. Polio

(57) ABSTRACT

The present disclosure provides a 3D printer including a receiving surface for accepting the accumulation of material layers, and a gantry having a shaft and carriage that is translated along the shaft, and an extruder assembly that is articulated to rotate a printing plane, wherein the extruder assembly is attached to the carriage and the articulated extruder assembly is manipulated to rotate the printing plane away from parallel with the receiving surface.

16 Claims, 13 Drawing Sheets

Related U.S. Application Data

(60) Provisional application No. 62/716,852, filed on Aug. 9, 2018.

(51) Int. Cl.
*B29C 64/194* (2017.01)
*B29C 64/209* (2017.01)
*B29C 64/241* (2017.01)
*B29C 64/245* (2017.01)
*B33Y 10/00* (2015.01)
*B33Y 30/00* (2015.01)

(52) U.S. Cl.
CPC ............ *B29C 64/245* (2017.08); *B33Y 10/00* (2014.12); *B33Y 30/00* (2014.12); *B29C 64/182* (2017.08); *B29C 64/194* (2017.08)

(56) References Cited

U.S. PATENT DOCUMENTS

| | | | |
|---|---|---|---|
| 6,144,008 A * | 11/2000 | Rabinovich | C04B 38/0006 |
| | | | 219/121.64 |
| 10,613,496 B2 * | 4/2020 | Suresh | B29C 64/386 |
| 11,584,065 B2 * | 2/2023 | Riha | B33Y 10/00 |
| 11,745,423 B2 * | 9/2023 | Riha | B33Y 10/00 |
| | | | 156/60 |
| 11,813,790 B2 * | 11/2023 | Rowe | B33Y 80/00 |
| 12,296,434 B2 * | 5/2025 | Tanikella | B24D 18/0054 |
| 12,384,102 B2 * | 8/2025 | Leibig | B29C 64/118 |
| 2002/0167101 A1 * | 11/2002 | Tochimoto | B29C 64/112 |
| | | | 425/130 |
| 2013/0295338 A1 * | 11/2013 | Keating | E04B 1/167 |
| | | | 425/375 |
| 2014/0291886 A1 | 10/2014 | Mark et al. | |
| 2015/0005920 A1 * | 1/2015 | Matsumoto | B29C 64/124 |
| | | | 700/119 |
| 2015/0174824 A1 | 6/2015 | Gifford et al. | |
| 2015/0182811 A1 | 7/2015 | Bender | |
| 2015/0224712 A1 | 8/2015 | Tjellesen et al. | |
| 2015/0224718 A1 | 8/2015 | Ederer et al. | |
| 2015/0251358 A1 | 9/2015 | Ho et al. | |
| 2015/0367375 A1 | 12/2015 | Page | |
| 2016/0193791 A1 | 7/2016 | Swanson et al. | |
| 2017/0165917 A1 | 6/2017 | McKiel, Jr. | |
| 2017/0252966 A1 * | 9/2017 | Susnjara | B33Y 30/00 |
| 2017/0259502 A1 | 9/2017 | Chapiro et al. | |
| 2017/0312986 A1 * | 11/2017 | Qian | B29C 64/386 |
| 2018/0015655 A1 | 1/2018 | Gheorghescu et al. | |
| 2018/0050499 A1 | 2/2018 | Makover et al. | |
| 2018/0141273 A1 | 5/2018 | Santiago, Jr. et al. | |
| 2019/0077081 A1 * | 3/2019 | Susnjara | B29C 64/386 |
| 2020/0269352 A1 * | 8/2020 | Maurer | B23K 26/082 |
| 2021/0039319 A1 * | 2/2021 | Rieger | B29C 64/393 |
| 2021/0268715 A1 | 9/2021 | Anderson et al. | |
| 2024/0391161 A1 | 11/2024 | Anderson et al. | |

OTHER PUBLICATIONS

Written Opinion for PCT/US2019/045277 (Non-Orthogonal Additive Manufacturing and the Treatment of Parts Manufactured Thereof, filed Aug. 6, 2019), issued by ISA/US, 10 pages (Oct. 11, 2019).

* cited by examiner

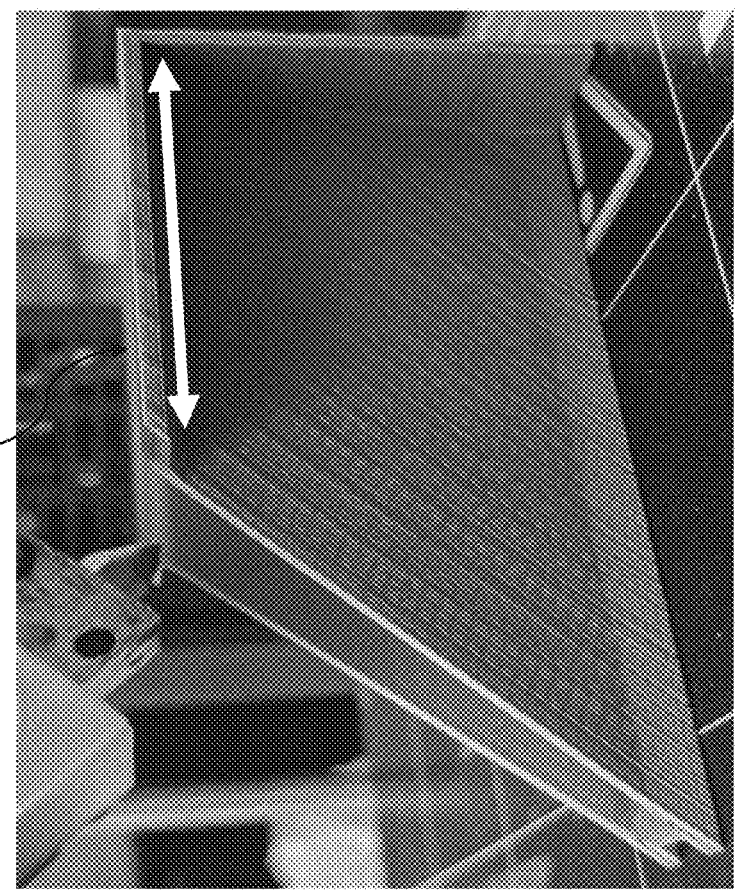
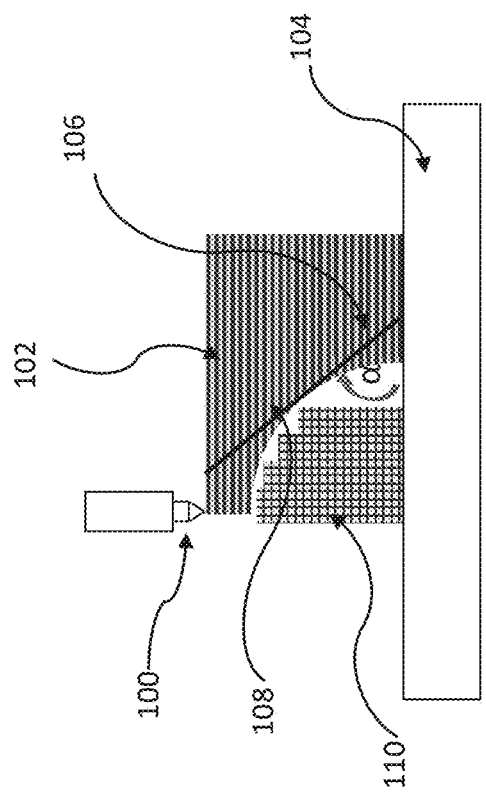
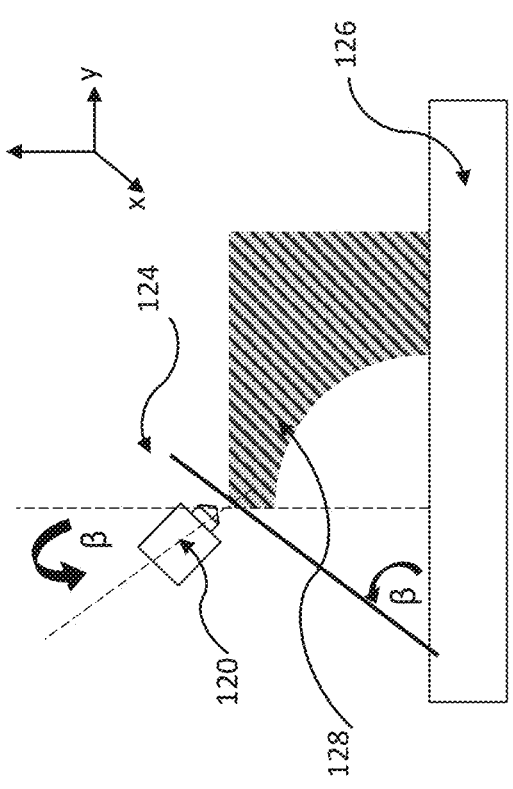
Fig. 1A
Fig. 1B
Fig. 1C

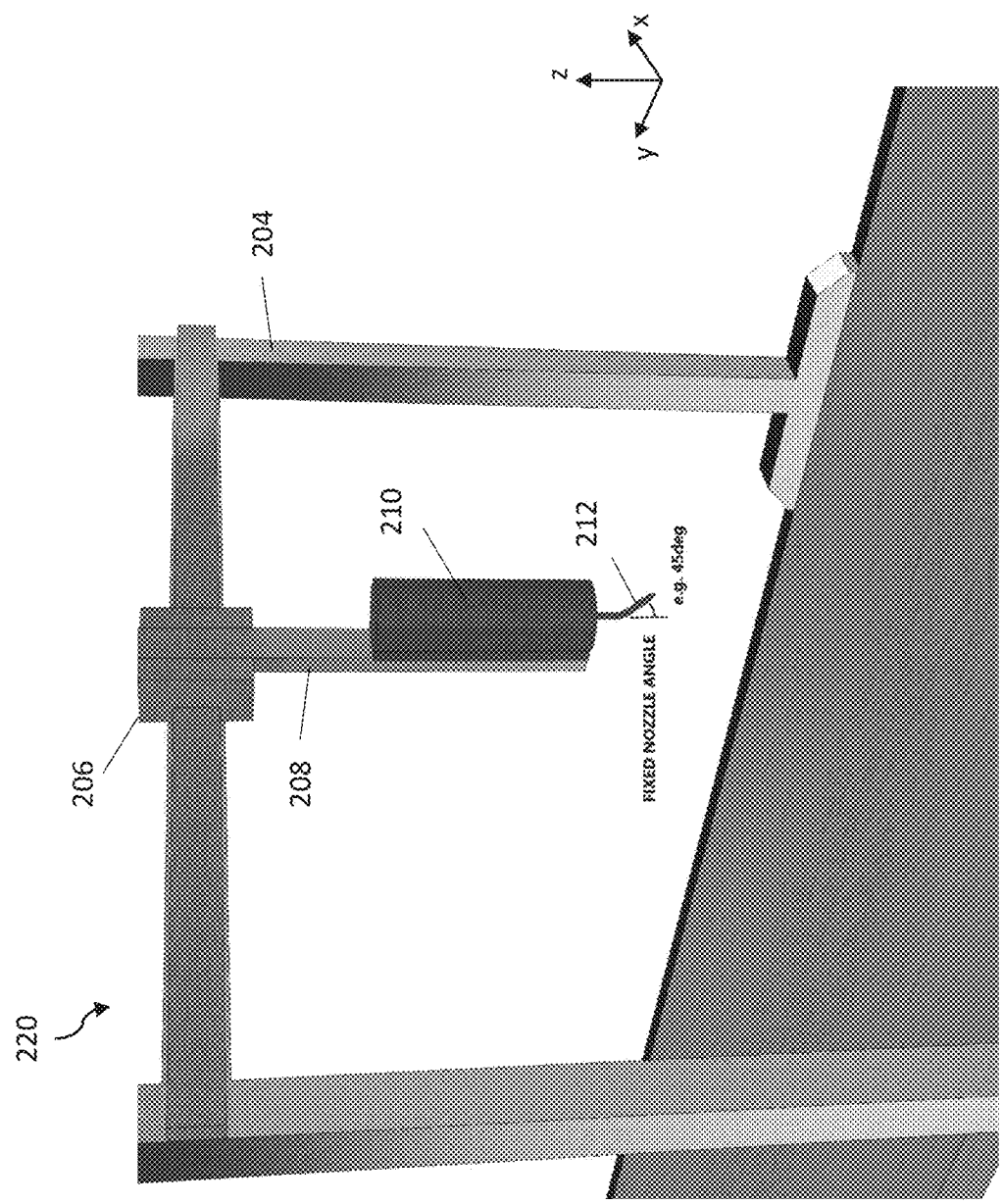

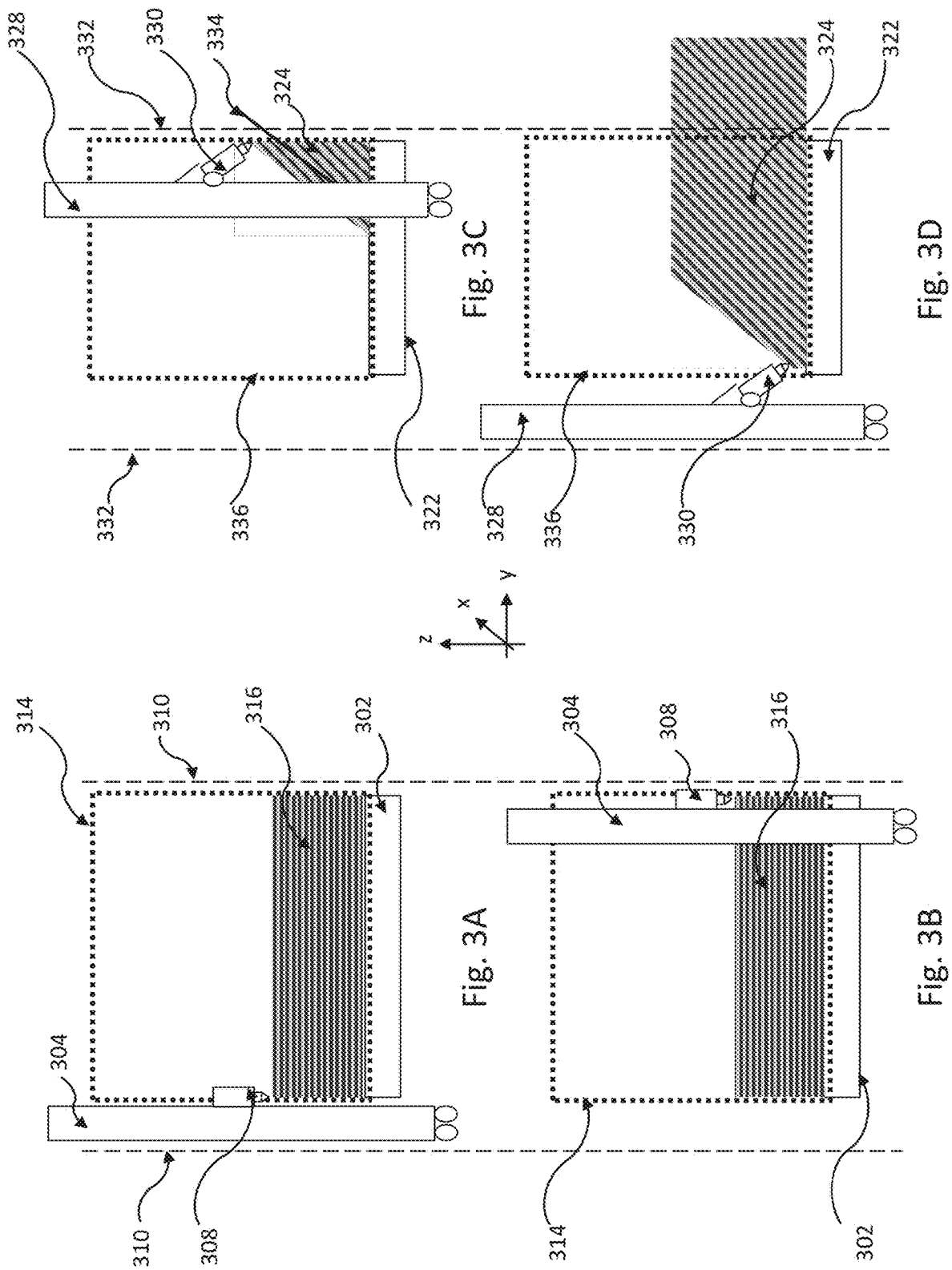

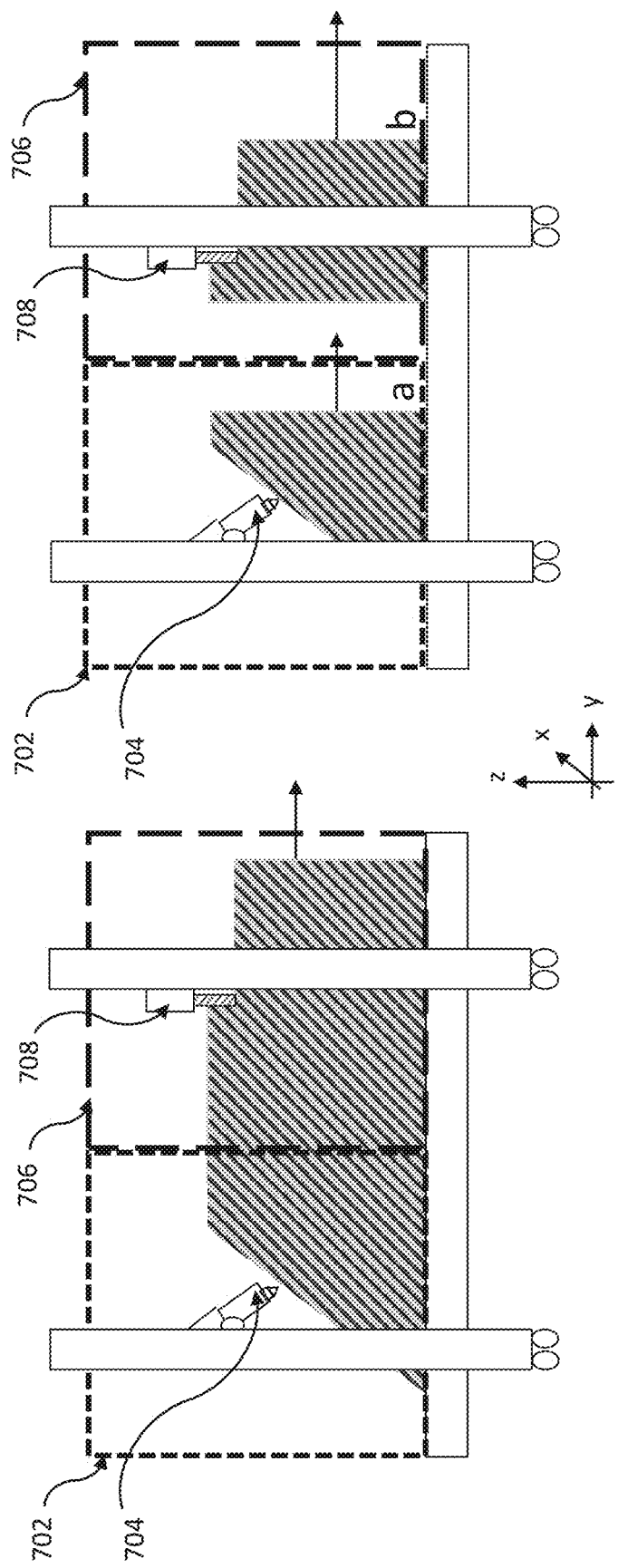

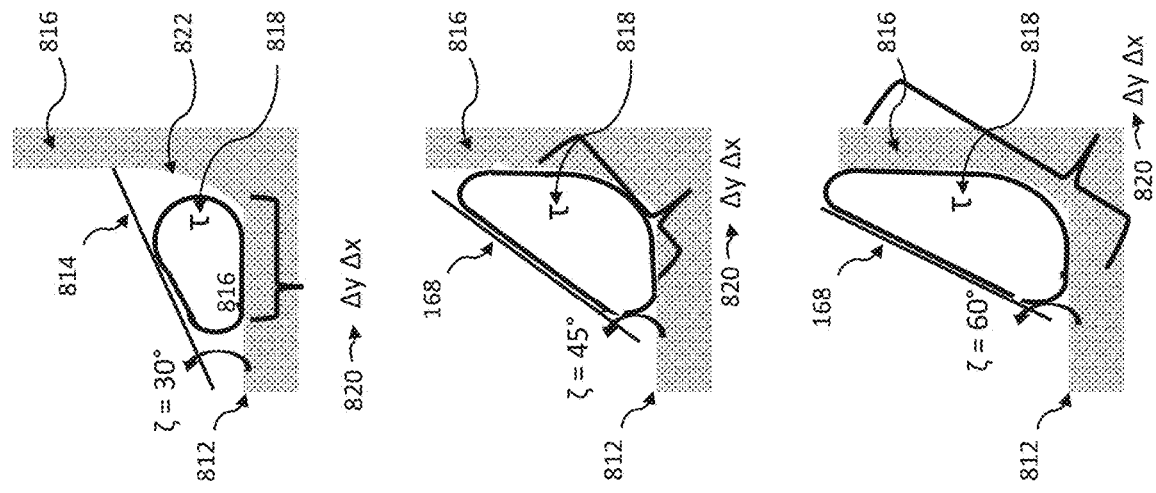
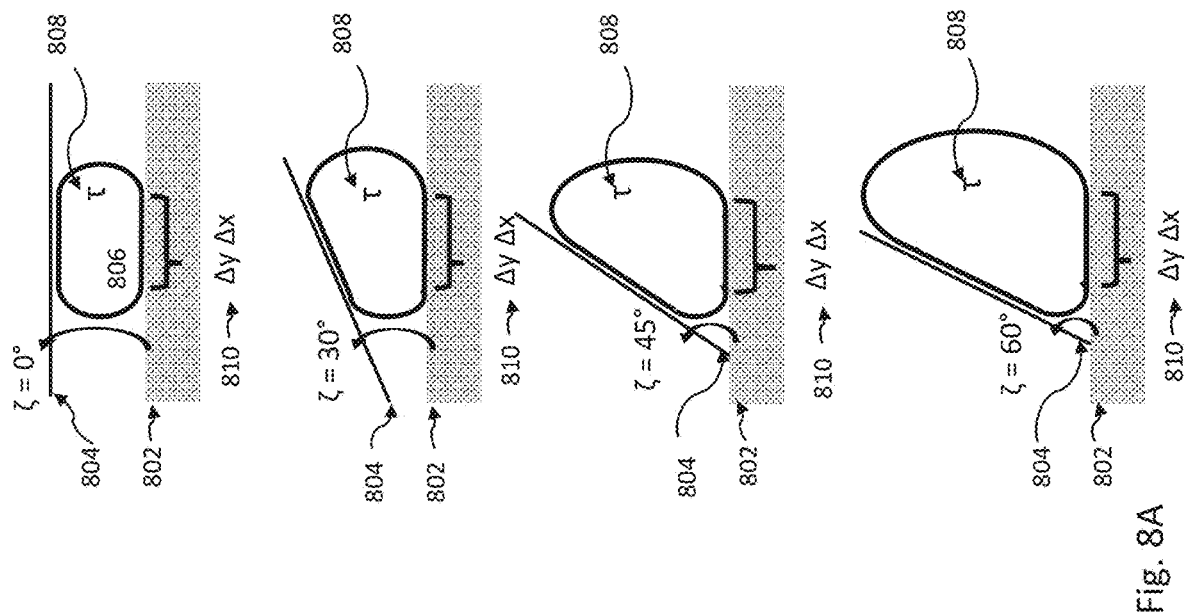
Fig. 8A
Fig. 8B

NON-ORTHOGONAL ADDITIVE MANUFACTURING AND THE TREATMENT OF PARTS MANUFACTURED THEREOF

CROSS-REFERENCE TO RELATED APPLICATION

The present application is a divisional application of U.S. application Ser. No. 17/262,275, filed Jan. 22, 2021, which is a 371 National Stage entry of International Application No. PCT/US19/45277, filed Aug. 6, 2019, which claims the benefit of U.S. Provisional Application No. 62/716,852, filed Aug. 9, 2018, the contents which are hereby incorporated by reference in their entireties.

GOVERNMENT SUPPORT

This invention was made with government support under CEED SINIT-16-0013 awarded by Consortium for Energy, Environment and Demilitarization (CEED). The U.S. government has certain rights in the invention.

BACKGROUND

Additive manufacturing, or 3D printing, uses a layered approach to build parts and is an important manufacturing tool in a number of industries for the fabrication of automotive components, aerospace components, packaging materials, construction components, medical components, and the like. Conventionally, in 3D printing, layers are printed horizontally and built up vertically layer upon layer to form an end product or part thereof. Therefore, the print angle (i.e., the angle between the print plane and the horizontal plane) is commonly referred to as a zero degree angle. Additional support material not essential to the final part geometry is required for layers that overhang beyond previously deposited layers in the horizontal direction.

Parts are often 3D printed with their longitudinal axis oriented in the vertical direction to minimize the amount of support material needed, but are then limited by the vertical height, z-height, of the printer. In situations where the part size is greater than the machine capacity, the part may be split into separate pieces, printed, and then joined afterwards. The splitting and joining process creates complexity where mating surfaces need to be well aligned and typically requires additional machining.

Alternatively, to accommodate larger parts, a larger build volume may be constructed. For a conventional 3-axis printer additional y-axis length is the least expensive to incorporate using longer rails, extra x-axis width is more expensive due to the extra length of the gantry, and extra z-axis height is the most expensive to expand due to the greater stiffness required to overcome the inertia of the gantry at a greater height. Increasing a printer's build volume is therefore a cost balance between greater z-height and the surplus material required to support overhanging geometry.

Therefore, there is a need for an improved 3D printing system and method to build large 3D parts.

SUMMARY

In one aspect, the present disclosure provides 3D printers including a horizontal surface for accepting the accumulation of material layers, and a gantry having a shaft and carriage that is translated along the shaft, and an extruder assembly that is articulated to rotate a printing plane (e.g., to provide up to 5 axes of movement), wherein the extruder assembly is attached to the carriage and the articulated extruder assembly is manipulated to rotate the printing plane away from parallel with the horizontal surface. In some embodiments, the gantry offers a print area with a certain width and height through which a part that exceeds the print volume is printed by gradually moving the part away from the print area. In some embodiments, the printing plane angle relative to the horizontal bed is changed to increase material throughput for a given part geometry and layer cooling rate requirement. In some embodiments, the print angle is changed so that a 3D part with overhangs or hollow sections can be printed without the need for support material, or, in some cases, with a drastically reduced requirement for support material. In some embodiments, the extension of the part volume beyond printer volume drives the parallel post-processing of the part by means of a separate working volume into which the part enters and machining operations are executed.

In some embodiments, the print angle may be greater than or equal to 0 degree, greater than or equal to 30 degrees, greater than or equal to 45 degrees, greater than or equal to 60 degrees, or greater than or equal to 90 degrees, between 0 and 90 degrees, between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees. In another embodiment, the print angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). Other ranges are also possible.

In some embodiments, the surface that accepts initial material accumulation may be a rigid member with a curved receiving surface including the cross-section of an angled bar containing an internal radius, and a length spanning the width of said 3D printer's print volume in the x-direction, wherein the cross-section of the rigid member is consistent along the x-direction and said internal radius is constant or non-constant so as to increase the surface contact with material deposited by said 3D printer.

In another aspect, the present disclosure describes a 3D printer which includes a receiving surface for accepting the accumulation of material layers, a gantry, and an extruder assembly that is articulated to rotate a printing plane, wherein the extruder assembly is operably attached to the gantry (e.g., via a carriage) and the articulated extruder assembly is manipulated to rotate the printing plane away from parallel with the receiving surface.

In some embodiments, the receiving surface is movable. In some embodiments, the receiving surface includes a flat belt. In some embodiments, the receiving surface includes a plurality of pulleys. In some embodiments, the receiving surface is articulated to rotate away from parallel with a horizontal plane.

In some embodiments, the extruder assembly is articulated to rotate about one or more axes. In some embodiments, the extruder assembly is articulated to rotate and form a first angle with the receiving surface. In one embodiment, the first angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the first angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees).

In some embodiments, the extruder assembly comprises a nozzle and the nozzle is articulated to rotate about one or more axes. In some embodiments, the nozzle is articulated to rotate and form a second angle with the receiving surface. In one embodiment, the second angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the second angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees).

In some embodiments, the gantry offers a print volume with a first width and first height through which a part that exceeds the print volume is printed by gradually moving the part away from the print volume.

In some embodiments, the printing plane angle relative to the horizontal bed is changed to increase material throughput for a given part geometry and layer cooling rate requirement. In some embodiments, the print angle is changed so that a 3D part with overhangs or hollow sections can be printed without the need for support material, or in some cases, printed with a dramatically reduced amount of support material required (e.g., 25%, 50%, 75%, 90% or less support material required as compared to the same part being printed with traditional 3d printing technologies).

In some embodiments, the extension of the part volume beyond printer volume drives the parallel post-processing of the part by means of a separate working volume into which the part enters and machining operations are executed.

In some embodiments, the receiving surface is a rigid member with a curved surface which includes an angled bar with an internal radius, and a length spanning the width of the 3D printer's build volume in a first direction, wherein the cross-section of the rigid member is consistent along the first direction to increase the surface contact with material deposited by said 3D printer.

In another aspect, the present disclosure describes a method of printing a 3D part using a 3D printer. The method include providing a gantry of the 3D printer; providing an extruder assembly of the 3D printer wherein the extruder assembly is operably attached to the gantry (e.g., via a carriage), and wherein the extruder assembly is configured to print a material in a printing plane and the printing plane forms a first angle with a horizontal plane; rotating the extruder assembly so that the printing plane forms a second angle with the horizontal plane; and depositing a layer of the material on a receiving surface.

In some embodiments, the first angle and second angle are different. In one embodiment, the first angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the first angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees).

In another embodiment, the second angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the second angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees).

In another aspect, the present disclosure describes a 3D printer which includes a receiving surface for accepting the accumulation of material layers, a gantry, and an extruder assembly having a nozzle that is articulated to rotate a printing plane, wherein the extruder assembly is operably attached to the gantry (e.g., via a carriage), and the articulated nozzle is manipulated to rotate the printing plane away from parallel with the receiving surface.

In some embodiments, the receiving surface is movable. In some embodiments, the receiving surface is articulated to rotate away from parallel with a horizontal plane.

In some embodiments, the nozzle is articulated to rotate about one or more axes.

In some embodiments, the gantry offers a print volume with a certain width and height through which a part that exceeds the print volume is printed by gradually moving the part away from the print volume.

In another aspect, the present disclosure describes a method of printing a 3D part using a 3D printer. The method includes providing a gantry of the 3D printer; providing an extruder assembly of the 3D printer wherein the extruder assembly is operably attached to the gantry (e.g., via a carriage), wherein the extruder assembly comprises a nozzle and the nozzle is configured to print a material in a printing plane and the printing plane forms a first angle with a horizontal plane; rotating the nozzle so that the printing plane forms a second angle with the horizontal plane; and depositing a material layer on a receiving surface.

In some embodiments, the first angle and second angle are different. In one embodiment, the first angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the first angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). In another embodiment, the second angle is between 0 and 90 degrees (e.g., between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees). In another embodiment, the second angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees).

In another aspect, the present disclosure describes systems and methods of printing a 3D part. In some embodiments, compared to a conventional 3-axis printer, the systems and methods within the scope of the present disclosure may reduce a material requirement by at least 5%, at least 10%, at least 20%, at least 30%, at least 40%, at least 50%, at least 60%, or at least 70%. In some embodiments, compared to a conventional 3-axis printer, the systems and methods within the scope of the present disclosure may reduce a material requirement by a range of between 0 and 5%, between 0 and 10%, between 0 and 20%, between 0 and 30%, between 0 and 40%, between 0 and 50%, between 0 and 60%, between 0 and 70%, between 10% and 20%, between 10% and 30%, between 10% and 40%, between 10% and 50%, between 10% and 60%, between 10% and 70%.

BRIEF DESCRIPTION OF THE DRAWINGS

The foregoing and other objects, aspects, features, and advantages of the present disclosure will become more apparent and better understood by referring to the following description taken in conjunction with the accompanying drawing.

FIG. 1A is a schematic illustration of a printing process using a conventional 3-axis 3D printer showing the need for support material. FIG. 1B is a schematic illustration of a printing process using a 5-axis 3D printer showing the layer-support accumulation that reduces support requirements, according to some embodiments of the present disclosure. FIG. 1C is an illustration of a 3D part built by a 3D printer within the scope of the present disclosure with no support required for overhanging flanges, according to some embodiments of the present disclosure.

FIG. 2B is a schematic illustration of a 3D printer with a fixed nozzle angle, according to some embodiments of the present disclosure.

FIGS. 3A and 3B are schematic illustrations showing the part volume bound by the machine volume in a conventional 3-axis printer. FIGS. 3C and 3D are schematic illustrations showing the part volume decoupled from the print volume in a printer in the scope of the present disclosure (e.g., a 5-axis printer) by means of gradually or segmentally moving a part out of the print volume during printing, according to some embodiments of the present disclosure.

FIGS. 7A and 7B are schematic illustrations showing separate processing spaces are created to allow continuous printing and post machining (FIG. 7A) or batch printing and post machining (FIG. 7B) to reduce the time and cost associated with post-processing of printed objects, according to some embodiments of the present disclosure.

FIG. 8A is a schematic illustration showing the downward pressure on the first layer of a part reduces and the amount of material required to be extruded increases without a receiver. FIG. 8B is a schematic illustration showing that using the shaped receiver for the first bead of material allows for even contact pressure across the bead and more consistent amounts of material to be deposited, according to some embodiments of the present disclosure.

Figure 2A:
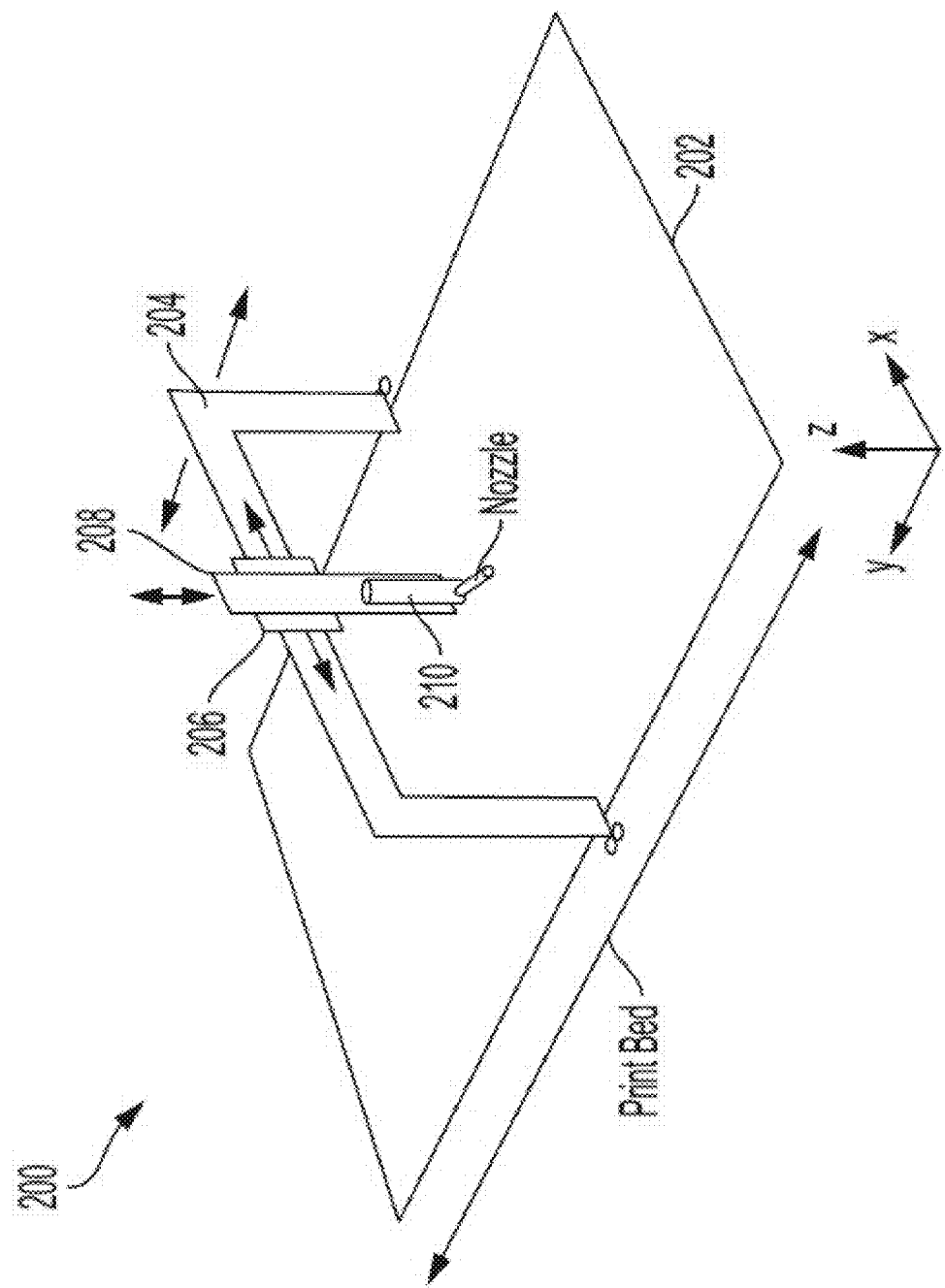
FIG. 2A is a schematic illustration of a 3D printer, according to some embodiments of the present disclosure.

The features and advantages of the present disclosure will become more apparent from the detailed description set forth below when taken in conjunction with the drawing, in which like reference characters identify corresponding elements throughout. In the drawing, like reference numbers generally indicate identical, functionally similar, and/or structurally similar elements. The figures are not drawn to scale since the variation in size of various elements in the Figures is too great to permit depiction to scale.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

Elements of embodiments described with respect to a given aspect of the invention may be used in various embodiments of another aspect of the invention. For example, it is contemplated that features of dependent claims depending from one independent claim can be used in apparatus, articles, systems, and/or methods of any of the other independent claims.

The mention herein of any publication, for example, in the Background section, is not an admission that the publication serves as prior art with respect to any of the claims presented herein. The Background section is presented for purposes of clarity and is not meant as a description of prior art with respect to any claim.

As used herein, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) where ranges are provided, endpoints are included.

As used herein, the terms "about" or "approximately", when used herein in reference to a value, refers to a value that is similar, in context to a referenced value. In general, those skilled in the art, familiar with the context, will appreciate the relevant degree of variance encompassed by "about" or "approximately" in that context. For example, in some embodiments, the terms "about" or "approximately" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

As used herein, the term "substantially" refers to the qualitative condition of exhibiting total or near-total extent or degree of a characteristic or property. For example, a substantially constant value may vary in time by 20%, 15%, 10%, 9%, 8%, 7%, 6%, 5%, 4%, 3%, 2%, 1%, or less of the constant value.

A conventional 3-axis 3D printer shown in FIG. 1A articulates an extruder assembly 100 within a plane 102 parallel to a print bed 104 that is conventionally horizontal. Cross-sections of the part to be printed are built in succession along the z-axis normal to the print bed 104. When part geometry requires a material layer 108 to be printed inclined below an angle α from a build plate 106 it is said to exceed the allowable overhang angle. Successfully printing such a surface therefore requires additional external support material 110 to be built from the print bed 104 and up to the unsupported layers 108. Additionally, if the part geometry includes hollow sections, internal support material (i.e., infill) is required to support the hollow sections when using traditional 3d printing technologies.

Additional external support structures or infills add to the cost of the 3D part as they consume material which is later removed and discarded. They also increase the total print time because of the extra structures that need to be printed. After printing, the additional support structures have to be removed before the 3D part is ready for use, which adds post processing work and cost. Furthermore, because the support structures need to touch and often stick to the walls of the model, removing them after printing may cause damages the surface of the part or even the entire part accidentally.

In order to solve the above issues, the present disclosure describes, inter alia, a 3D printer that uses a variable print angle (e.g., variable during the printing process) to reduce the need for support material. As shown in FIG. 1B an extruder assembly (or nozzle) 120 rotating at an angle β about the x-axis causes rotation of a printing plane 124 out of parallel with a print bed 126 at the angle β. New material layers are supported by previous layers and the surface inclination limit 106 present in the conventional methods shown in FIG. 1A is absent. This can reduce the need for external support structures and infills not essential to the primary part geometry. Removing the need for support material reduces the amount of material needed and the amount of time needed to print the part.

In some embodiments, the print angle is set to a certain value before the printing process begins and fixed during the printing process. In some embodiments, the print angle is variable during the printing process. FIG. 1C shows a part printed with a 45 degree print angle requiring no support for an overhanging flange 130 with a zero degree angle to the print bed.

The print angle, as used herein, is defined as the angle between a printing plane and a horizontal plane. In some embodiments, the print angle may be greater than or equal to 0 degree, greater than or equal to 10 degrees, greater than or equal to 30 degrees, greater than or equal to 45 degrees, greater than or equal to 60 degrees, or greater than or equal to 90 degrees. In certain embodiments, the print angle may be less than or equal to 90 degrees, less than or equal to 75 degrees, less than or equal to 60 degrees, less than or equal to 45 degrees, less than or equal to 30 degrees, less than or equal to 15 degrees, between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees. In another embodiment, the print angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). Other ranges are also possible.

FIG. 2A shows a schematic view of a 3D printer 200, according to some embodiments of the present disclosure. The 3D printer 200 can include a print bed 202, a gantry 204, an x-carriage 206, a z-carriage 208, and an extruder assembly 210.

The print bed 202 can include a receiving surface for accepting a printing material and provide mechanical support for a 3D part during the printing process and it can be fixed or movable. In some embodiments, the print bed 202 includes a fixed receiving surface. In some embodiments, the print bed 202 includes a moving mechanism such as a moving table, a movable belt or a plurality of pulleys. A printing material can be deposited on the print bed directly or indirectly. In some embodiments, a material is directly printed on the print bed 202 to form a layer that adheres to the print bed. In some embodiments, a material is printed on one or more intermediate layers that are directly printed onto the receiving surface of the print bed 202. The print bed 202 can include a temperature control mechanism. In some embodiments, the print bed 202 is heated to an elevated temperature during printing. In one embodiment, the elevated temperature is between 0 and 200° C. (e.g., between 0 and 180° C., between 0 and 160° C., between 0 and 140° C., between 0 and 120° C., between 0 and 100° C., between 0 and 80° C., between 0 and 60° C., between 20° C. and 200° C., between 40° C. and 180° C., between 60° C. and 160° C., between 80° C. and 140° C., and between 100° C. and 120° C.). In some embodiments, the print bed 202 is cooled during printing. In one embodiment, the print bed 202 is cooled by one or more fans.

The gantry 204 can be configured to move in a certain direction over the print bed 202 and provide support for the x-carriage and z-carriage. As shown in FIG. 2A, the gantry 204 moves in the y-axis and includes a frame which is formed by interconnecting two vertical frame bar and a horizontal shaft. The gantry 204 can also include other configurations, for example, the gantry can be fixed while the print bed is movable along y and/or z axes. In some embodiments, the gantry may include at least one shaft and at least one frame, wherein the shaft and the frame are connected. In some embodiments, the gantry may include at least one arm and at least one rail, wherein the arm is attached to the rail. In some embodiments, the gantry may include other configurations.

In some embodiments, the printer is a delta printer which comprises one or more arms on rails to move an extruder assembly. In some embodiments, the printer comprises a robotic arm that an extruder assembly is mounted on.

In some embodiments, the print bed 202 is fixed while the gantry 204 moves over the print bed 202 during a printing process. In some embodiments, the gantry 204 is fixed while a receiving surface of the print bed 202 moves in a direction during a printing process. In some embodiments, the gantry 204 and the receiving surface of the print bed 202 are both movable.

The x-carriage 206 and z-carriage 208 can be mounted on the shaft of the gantry 204 and move along the shaft in the x-axis and z-axis, respectively. In the embodiment shown in FIG. 2A, the x-carriage 206 is mounted on the gantry 204 and moves along the shaft in the x-axis. The z-carriage 208 is mounted on the x-carriage 206 and moves in the z-axis.

The extruder assembly 210 can be mounted on the x-carriage or z-carriage. As shown in FIG. 2A, the extruder assembly 210 is mounted on the z-carriage. In some embodiments, the extruder assembly is articulated to rotate about one or more axes (e.g., x, y, or z axis). In some embodiments, the extruder assembly is articulated to rotate around two or more axes. Therefore, with the degrees of freedom along the x, y and z axes and two rotational degrees of freedom, the extruder assembly can move in five axes to print 3D parts with complex shapes. In some embodiments, the extruder assembly 210 includes a rotatable nozzle and the nozzle is articulated to rotate about one or more axes.

The schematics in FIG. 2A are only shown for illustrative purposes and a 3D printer within the scope of the present disclosure can employ other configurations. For example, the z-carriage can be directly mounted on the gantry and the x-carriage can be mounted on the z-carriage. Accordingly, the extruder assembly can be mounted on the x-carriage.

The systems and methods described herein can be employed to convert an existing 3-axis printer into a 5-axis printer. In some embodiments, an extruder assembly of the existing 3-axis printer is replaced with a rotatable extruder assembly. In some embodiments, only a nozzle of the existing 3-axis printer is replaced with a rotatable nozzle.

FIG. 2B is a schematic illustration of a 3D printer 220, according to some embodiments of the present disclosure. Similar to the exemplary printer 200 shown in FIG. 3A, the x-carriage 206 and z-carriage 208 can be mounted on the shaft of the gantry 204 and move along the shaft in the x-axis and z-axis, respectively. The extruder assembly 210 is mounted on the z-carriage 208 and can include a nozzle 212 that forms a fixed angle with an extended axis of the extruder assembly 210. In some embodiments, the angle may be greater than or equal to 0 degree, greater than or equal to 30 degrees, greater than or equal to 45 degrees, greater than or equal to 60 degrees, or greater than or equal to 90 degrees, between 0 and 90 degrees, between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees. In another embodiment, the angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). Other ranges are also possible.

Figure 2C:
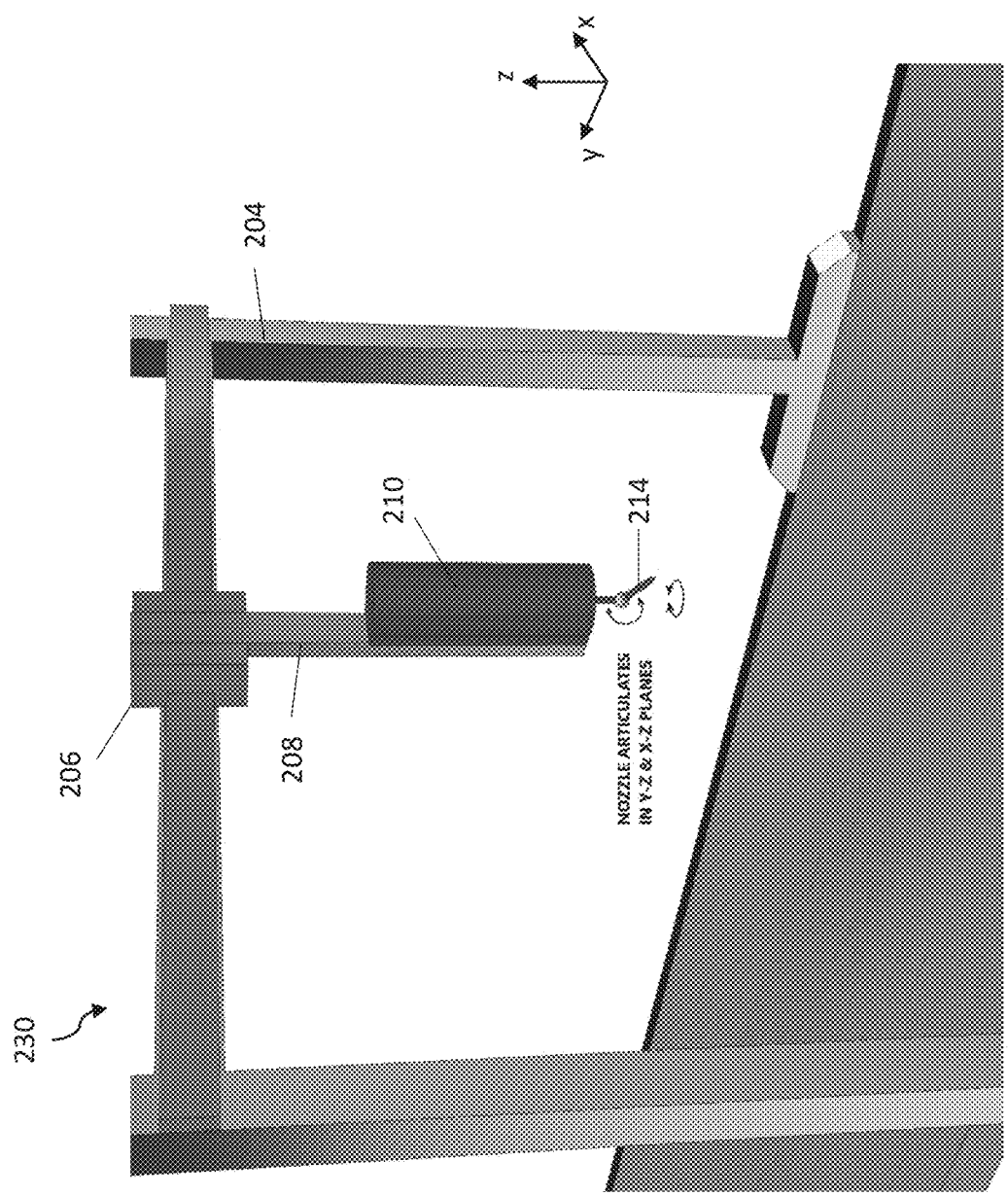
FIG. 2C is a schematic illustration of a 3D printer with an articulated nozzle, according to some embodiments of the present disclosure.

FIG. 2C is a schematic illustration of a 3D printer 230, according to some embodiments of the present disclosure. Similar to the exemplary printer 200 shown in FIG. 2A, the x-carriage 206 and z-carriage 208 can be mounted on the shaft of the gantry 204 and move along the shaft in the x-axis and z-axis, respectively. The extruder assembly 210 is mounted on the z-carriage 208 and can include a rotatable nozzle 214 which may articulate in y-z and/or x-z planes. The articulation of the nozzle 214 rotates the printing plane away from parallel with the print bed, resulting in a change of the print angle. In some embodiments, the print angle may be greater than or equal to 0 degree, greater than or equal to 30 degrees, greater than or equal to 45 degrees, greater than or equal to 60 degrees, or greater than or equal to 90 degrees, between 0 and 90 degrees, between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees. In another embodiment, the print angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). Other ranges are also possible.

In some embodiments, varying the nozzle location can be achieved by rotating the nozzle in the one or more planes (e.g., x-z and/or y-z planes). In some embodiments, varying the nozzle location can be achieved by rotating the nozzle in one plane (e.g., x-z or y-z plane) to achieve the desired angle and then rotating the shaft of the nozzle about the z-axis to achieve the desired direction.

Figure 2D:
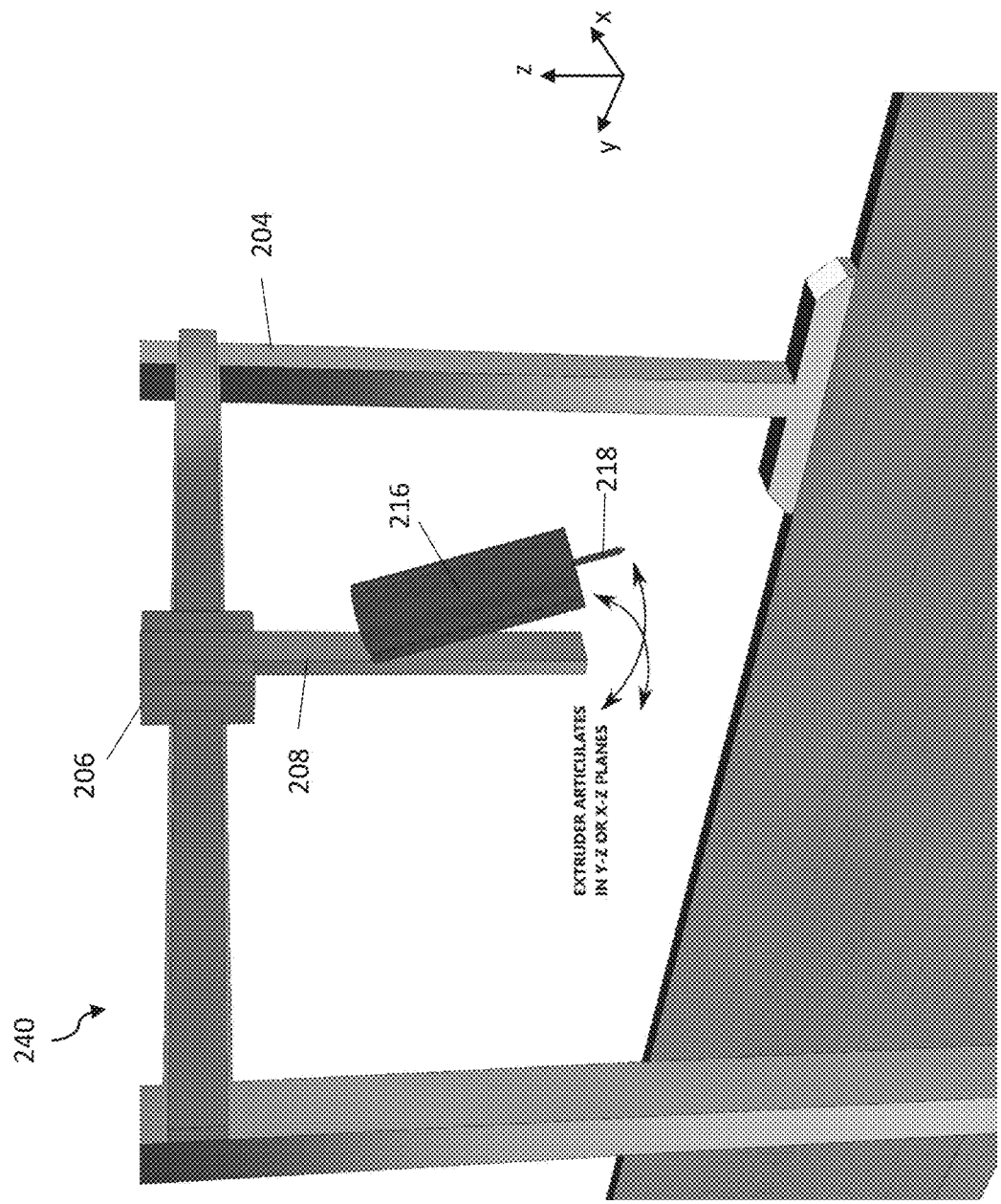
FIG. 2D is a schematic illustration of a 3D printer with an articulated extruder assembly, according to some embodiments of the present disclosure.

FIG. 2D is a schematic illustration of a 3D printer 240, according to some embodiments of the present disclosure. Similar to the exemplary printer 200 shown in FIG. 2A, the x-carriage 206 and z-carriage 208 can be mounted on the shaft of the gantry 204 and move along the shaft in the x-axis and z-axis, respectively. The extruder assembly 216 is mounted on the z-carriage 208 and can include a nozzle 218. The extruder assembly 216 may articulate in y-x and/or x-z planes. The nozzle 218 may be fixed to the extruder assembly 216. The articulation of the extruder assembly 216 rotates the printing plane away from parallel with the print bed, resulting in a change of the print angle. In some embodiments, the print angle may be greater than or equal to 0 degree, greater than or equal to 30 degrees, greater than or equal to 45 degrees, greater than or equal to 60 degrees, or greater than or equal to 90 degrees, between 0 and 90 degrees, between 0 and 80 degrees, between 0 and 70 degrees, between 0 and 60 degrees, between 0 and 50 degrees, between 0 and 40 degrees, between 0 and 30 degrees, between 0 and 20 degrees, between 0 and 10 degrees, between 10 and 80 degrees, between 10 and 70 degrees, between 10 and 60 degrees, between 10 and 50 degrees, between 10 and 40 degrees, between 10 and 30 degrees, between 10 and 20 degrees, between 20 and 80 degrees, between 30 and 80 degrees, between 40 and 80 degrees, between 50 and 80 degrees, between 10 and 50 degrees, and 0 to 45 degrees. In another embodiment, the print angle is between 0 and −90 degrees (e.g., between 0 and −80 degrees, between 0 and −70 degrees, between 0 and −60 degrees, between 0 and −50 degrees, between 0 and −40 degrees, between 0 and −30 degrees, between 0 and −20 degrees, between 0 and −10 degrees, between −10 and −80 degrees, between −10 and −70 degrees, between −10 and −60 degrees, between −10 and −50 degrees, between −10 and −40 degrees, between −10 and −30 degrees, between −10 and −20 degrees, between −20 and −80 degrees, between −30 and −80 degrees, between −40 and −80 degrees, between −50 and −80 degrees, between −10 and −50 degrees, and 0 to −45 degrees). Other ranges are also possible.

One common configuration of a conventional 3D printer (e.g., a 3-axis printer), shown in FIGS. 3A and 3B, is where a print bed 302 may be static while a gantry 304 travels in the y-axis over the print bed 302 and then translates an extruder assembly 308 within the x-z plane at the gantry. The gantry 302 travels along the y-direction and is limited to the extremes of the printer's y-axis dimensions 310 as it traverses the machine volume shown in FIG. 3A at the left extreme and 3B at the right extreme. A part 316 is therefore bound by a print volume 314 which is in turn bound by the extreme dimensions of the printer 310.

In some embodiments, this present disclosure describes a 3D printer that allows parts to be printed through the gantry build envelope and oriented in the y-direction for infinite length printing, uncoupling the part longitudinal size requirements from actual machine volume. An aspect of the invention shown in FIG. 3C is configured where a part 324 stays static during printing with a moving gantry 328. The gantry 328 travels along the y-direction and translates an extruder assembly 330 in the x-z plane. Translation of the extruder assembly 330 in concert with the extruder assembly 330 or nozzle rotating in the z-y plane about the x-direction changes the angle of inclination between a printing plane 334 and a print bed 322. As layers of the part 324 accumulate the gantry 328 traverses the y-direction within a physical bounds 332 of the invention. A part of sufficient volume is capable of expanding beyond a print volume 336 by means of sliding the part 324 along the print bed 322, as shown in FIG. 3D. The 3D printer described herein is capable of producing parts that are of greater dimension than the machine's maximum dimensions.

In some embodiments, the extruder assembly rotates about two or more axes. For example, similar to the 3D printer shown in FIGS. 3C and 3D, while the gantry 328 travels along the y-direction and translates the extruder assembly 330 in the x-z plane, the extruder assembly 330 rotates in the z-y plane about the x-axis. In addition, the extruder assembly 330 can rotate in the x-y plane about the z-axis. Therefore, the extruder assembly 330 is able to move in 5 axes (translation in x, y and z axes and rotation about x and z axes). In some embodiments, the extruder assembly is fixed on the carrier while a nozzle of the extruder assembly is articulated to rotate about one or more axes to create 5-axis of nozzle movement.

Traditional 3D Printers have a limited range of allowed time between sequentially printed layers, referred to as allowed layer time. If the actual layer time during printing is too short, the previous layer is still hot and soft to print on. On the other hand, if the actual layer time during printing is too long, the previous layer has cooled and gives poor interlayer adhesion. Hence layers with large cross-sections may take too long to print which results in failure to adhere to previous layers, and layers with small cross-sections must be printed slowly which results in a reduction of the machine throughput. Varying the print angle for a given part allows the layer time to be improved for a large range of part geometries and allows for a wider range of part sizes that can be printed closer to the optimal speed settings to increase throughput.

Figure 4:
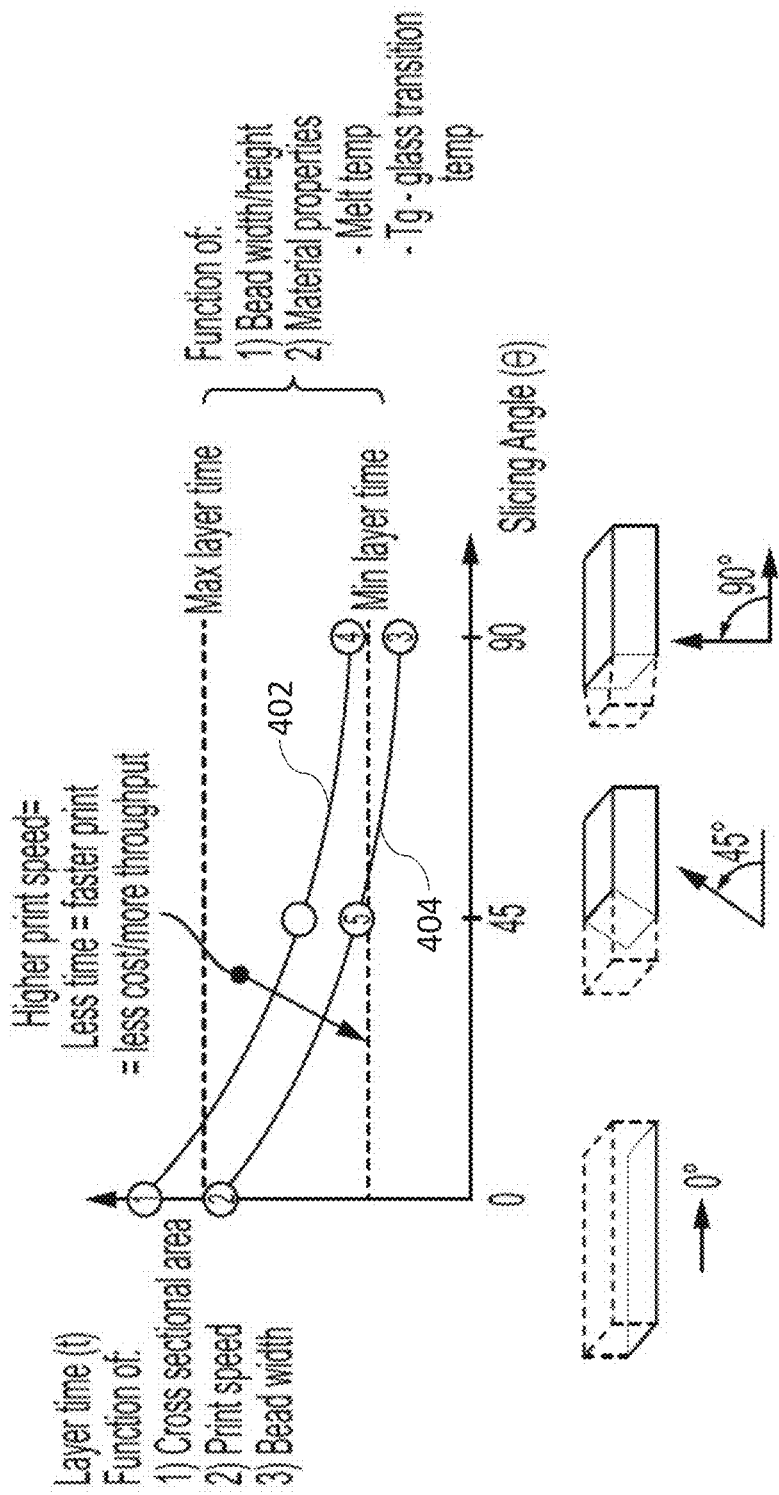
FIG. 4 is a schematic chart showing the layer time as a function of the print angle, according to some embodiments of the present disclosure.

For example, FIG. 4 is a chart showing a layer time t as a function of a print angle θ which is the angle between the print plane and the horizontal plane. The layer time is the time taken to print a given layer of the part, and also represents the amount of time the layer has to cool down before the next layer is deposited. If the layer time is too short then the material is still too hot and may be soft and not support the next layer. If the layer time is too long then the material is tool cold and the next layer will not adhere well to it.

In general, the layer time t depends on multiple factors including i) the cross sectional area of the 3D part to be printed, ii) the print speed of the 3D printer, and iii) the bead width. With a constant print speed and bead width, a larger cross section will lead to a longer layer time. The cross sectional area can be greatly affected by the print angle θ. As shown in FIG. 4, if the 3D part to be printed is a simple cuboid with a length greater than a width and height, a zero print angle will result in a largest cross sectional area and a longest layer time. Increasing the print angle θ can decrease the cross sectional area as well as the layer time until the print plane is perpendicular to the horizontal plane (print angle θ is 90 degrees).

Similarly, with the cross sectional area and the bead width unchanged, increasing the print speed will shorten the layer time. While decreasing bead width may be needed to print delicate features on a 3D part, it will inevitably lead to more passes for the same print area and therefore a longer layer time.

The allowed maximum and minimum layer time are determined, at least in part, by the bead width and the properties of the print material such as its melting temperature and glass transition temperature $T_g$. If the layer time is less than the allowed minimum layer time, the previous layer is still hot and soft while the new layer is being printed on top of it, which may cause the deformation of the 3D part. If the layer time is greater than the allowed maximum layer time, the previous layer has cooled substantially and gives poor interlayer adhesion between the layers. Therefore, it is desirable to maintain a layer time between the allowed maximum layer time and the allowed minimum layer time to achieve a satisfactory printing quality.

FIG. 4 shows two curves of constant print speeds 402 and 404, while 402 represents a lower print speed and 404 represents a higher print speed. A large part printed at a 0 degree print angle may lead to a layer time (labeled as position 1 on the curve 402) exceeding the maximum layer time and therefore not be printable. Increasing the print speed can partially reduce the layer time to position 2 on the curve 404 which is within the range of allowable layer time. By changing the print angle from 0 degree to 45 degrees, the print time can be reduced further to position 5 on curve 404 while maintaining the same print speed as position 2. On the other hand, if the part is printed with a print angle of 90 degrees at a higher print speed (i.e., a print speed corresponding to curve 404), the layer time (labeled as position 3) may be less than the minimum layer time and therefore prevent the part from being printed properly. While reducing the print speed can partially mitigate this issue, the overall print time (labeled as position 4) is also increased. Instead, changing the print angle to 45 degrees can allow for maintaining the high print speed without increasing the print time. Thus, adjusting the print angle can optimize the total throughput and print time.

Figure 5A:
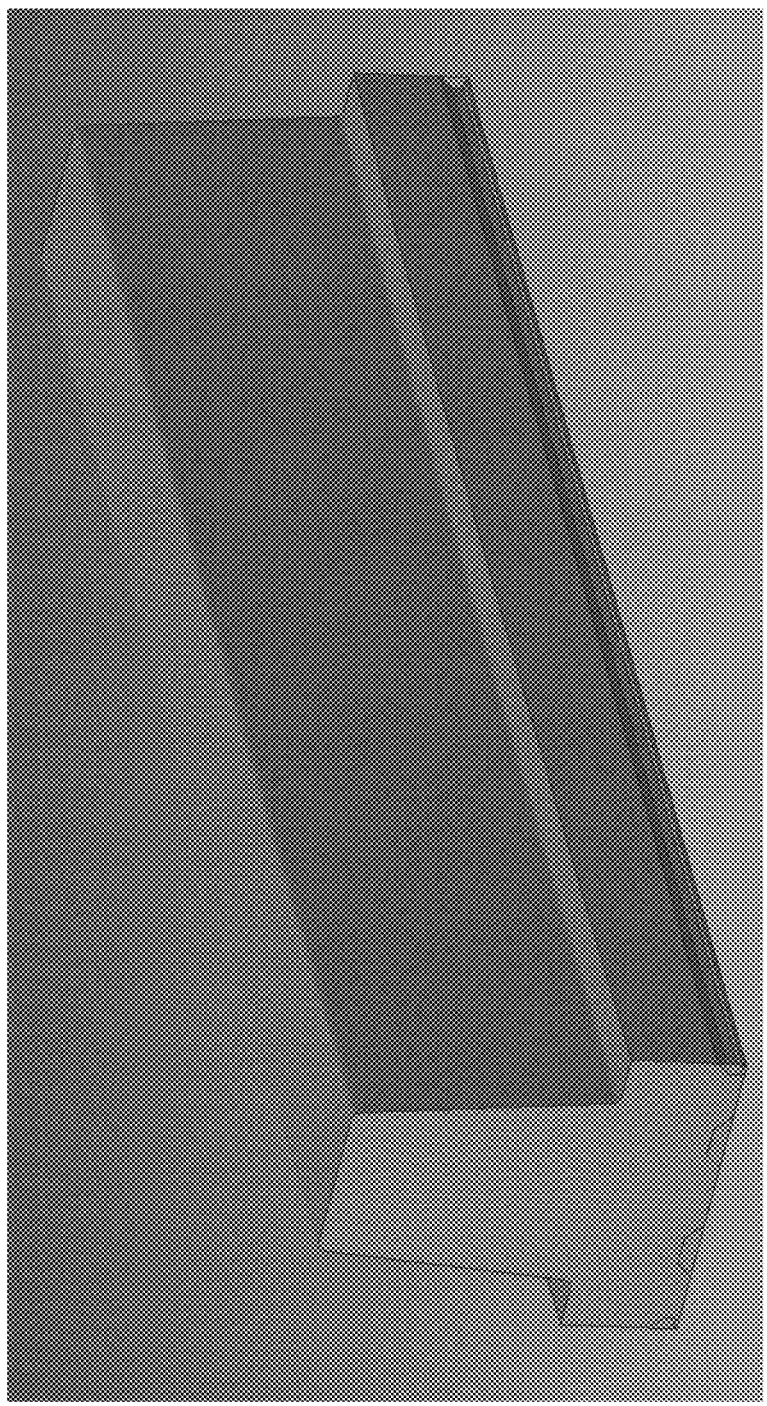
FIG. 5A is a schematic illustration of an exemplary 3D part model, according to some embodiments of the present disclosure.

FIG. 5A is a schematic illustration of an exemplary 3D part 500 that can be printed with a 3D printer, according to some embodiments of the present disclosure. In one embodiment, the 3D part 500 is a composite tool mold which is 23 feet long, 6 feet tall and 5 feet wide. The 3D part 500 may be printed with different print angles according to the systems and methods described herein. Varying the print angle may greatly affect the total print time and the material needed.

Figure 5C:
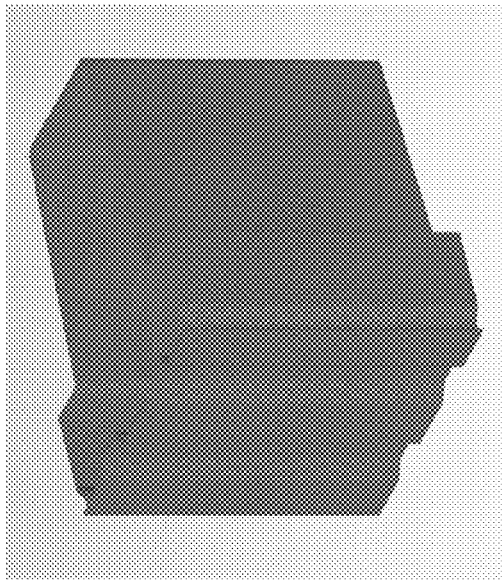
FIG. 5C is a schematic illustration of the reoriented 3D part model with a print angle of 0 degree, according to one embodiment of the present disclosure.
Figure 5B:
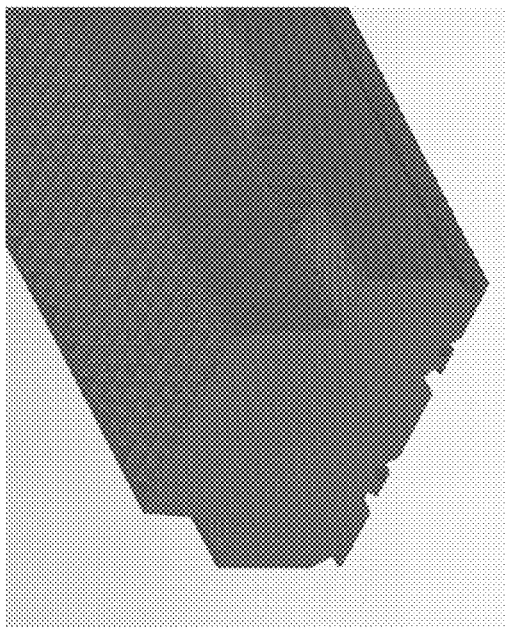
FIG. 5B is a schematic illustration of the 3D part model printed with a print angle of 0 degree, according to one embodiment of the present disclosure.

For example, as shown in FIG. 5B, the 3D part 500 can be printed at zero degree, i.e., the printing plane aligning with the horizontal plane. A simulation shows that the part requires printing a total of 358 layers with each layer taking about 24 minutes to complete, resulting in a total print time of 147 hours. The 24 minutes layer time greatly exceeds the allowed maximum layer time, and therefore, may lead to poor interlayer adhesion. Because of the need for support structures (i.e., infill), the whole part will require 9574 lb of material (e.g., 20% carbon fiber filled ABS with a specific density of 1.15 g/cm$^3$), which greatly increases the material cost of the part. Although the part can be printed in one piece, the amount of required material and long layer time makes the process uneconomical and impractical.

The need for support structures can be mitigated, in part, by reorientation of the part so that the longitudinal axis aligns with the vertical direction, as shown in FIG. 5C. The simulation shows that the part requires printing a total of 1380 layers with a layer time of 3.5 minutes, resulting in a total print time of about 80 hours. Although the amount of materials needed may be reduced to 4671 lb compared to the process shown in FIG. 5B, the entire 3D part will need to be printed in more than one pieces (e.g., four pieces) so that each piece may fit within the print volume and later joined together in a separate post processing step. This may dramatically increase the time and cost of post processing and machining time. The splitting and joining process creates complexity where mating surfaces need to be well aligned and typically requires additional machining.

Figure 5D:
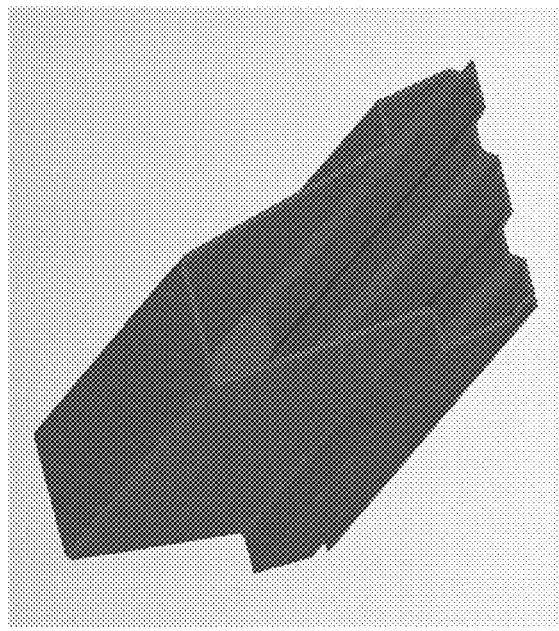
FIG. 5D is a schematic illustration of the 3D part model printed with a print angle of 45 degrees, according to one embodiment of the present disclosure.
Figure 5E:
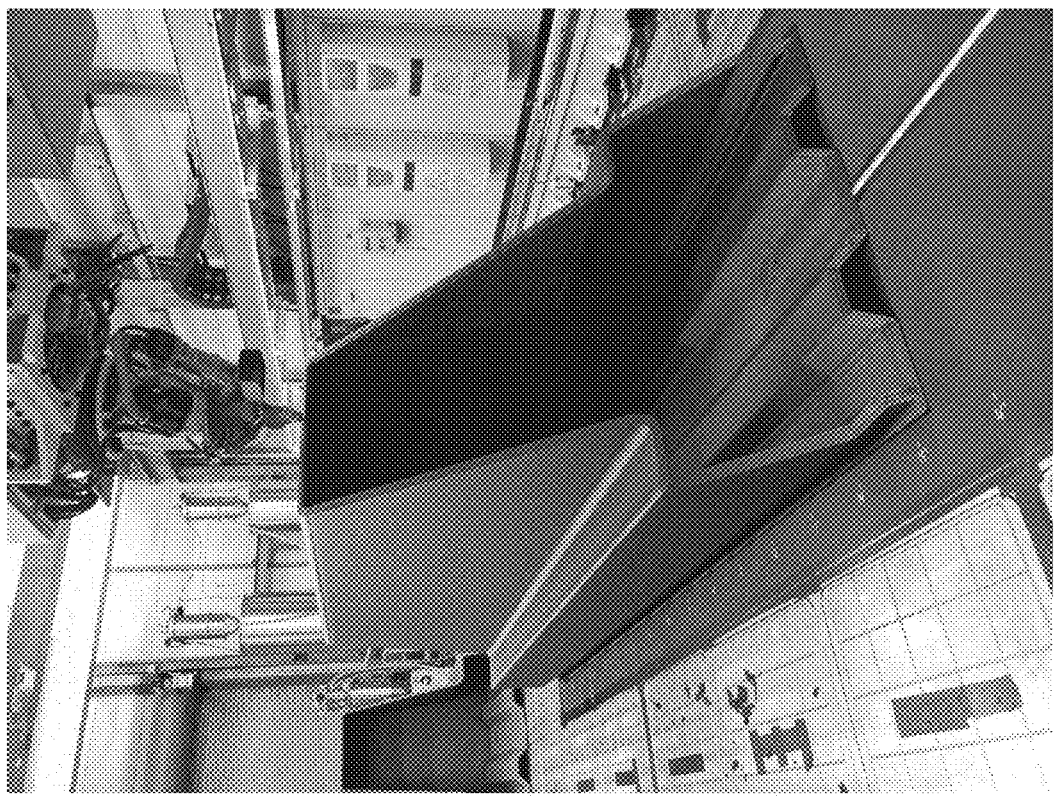
FIG. 5E is a photo of the 3D part printed with a print angle of 45 degrees, according to one embodiment of the present disclosure.

FIG. 5D shows an exemplary process in which the 3D part can be printed according to the systems and methods described in the present disclosure. By changing the print angle to 45 degrees, the part can be printed in 72 hours in one piece with 1224 layers while each layer takes 3.5 minutes to print. The total amount of material needed is also decreased to 4223 lb. Therefore, it is shown that the printing process for a large 3D part can be optimized by varying the print angle. FIG. 5E shows an embodiment of a 3D part similar to the model shown in FIG. 5A printed with a 45 degrees print angle using the system and method described in the present disclosure.

In some embodiments, compared to a conventional 3-axis printer, the systems and methods within the scope of the present disclosure may reduce a material requirement by at least 5%, at least 10%, at least 20%, at least 30%, at least 40%, at least 50%, at least 60%, or at least 70%. In some embodiments, compared to a conventional 3-axis printer, the systems and methods within the scope of the present disclosure may reduce a material requirement by a range of between 0 and 5%, between 0 and 10%, between 0 and 20%, between 0 and 30%, between 0 and 40%, between 0 and 50%, between 0 and 60%, between 0 and 70%, between 10% and 20%, between 10% and 30%, between 10% and 40%, between 10% and 50%, between 10% and 60%, between 10% and 70%.

Figure 6:
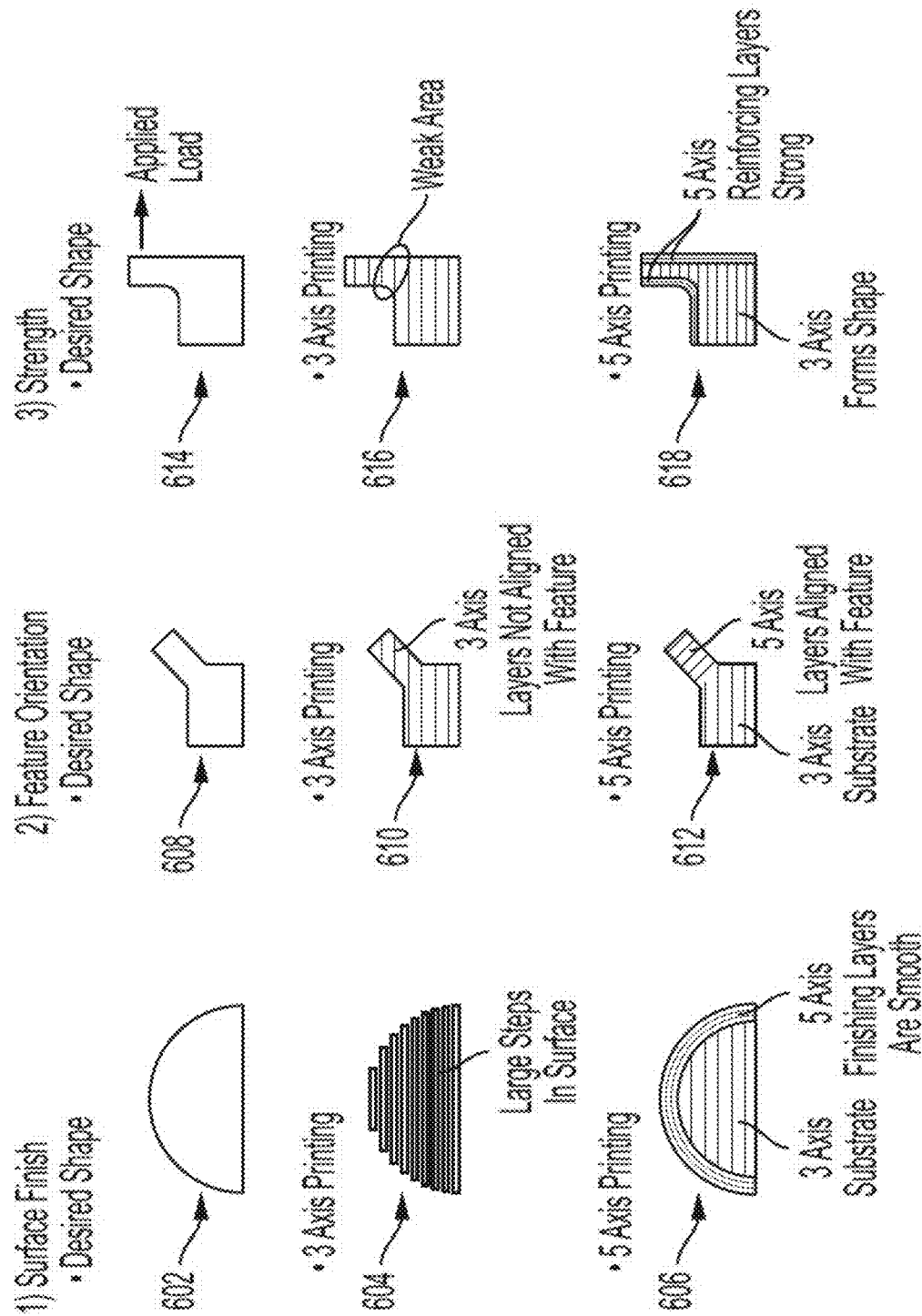
FIG. 6 is a schematic illustration showing exemplary advantages of a 5-axis printer compared to a conventional 3-axis printer, in accordance with some embodiments of the present disclosure.

FIG. 6 shows a comparison between a conventional 3-axis (x, y and z) printer and a 5-axis (x, y, z and two rotational axes) 3D printer, according to some embodiments of the present disclosure. Comparing to a 3-axis printer, the 5-axis printer can offer advantages including smoother surface finish, layer alignment with designed features and greater strength, particularly for complex prints.

Referring to FIG. 6, when printing a dome-shape design 602, a 3-axis printer usually results in rough surfaces with large steps in a final part 604. This is due to the layer-by-layer deposition with each layer aligning in the horizontal plane. The step height is determined by the layer thickness which can be adjusted by changing the nozzle size. Smaller nozzle size can help to smoothen the surface, but may substantially increase the build time. In contrast, because a 5-axis printer as described herein can change the print angle very easily, it can offer smoother surface finish through conformal printing in a final part 606. In some embodiments, additional pressure (e.g., beyond normal gravity and weight of layers printed superior to a particular layer) is applied to the conformal layers so that they can fill in the gaps between the inner and outer layers. In some embodiments, the layer thickness is increased in the conformal layers to fill the gaps.

When printing a complicated 3D part, the orientation of design features may affect the final accuracy, build time and strength of the final 3D part. A 3-axis printer cannot easily change print angle, and therefore, the entire part is usually printed with a fixed print angle. As in a design 608 shown in FIG. 6, a resulting 3D part 610 built by a conventional 3-axis printer may suffer from poor accuracy, low surface quality (e.g., stepover between layers) and long build time because the layers are not aligned with the design feature. In contrast, the 5-axis printer can adjust the print angle depending on the feature orientation and achieve optimal results in a final part 612. In some cases, an advantage of particular embodiments is the ability to alter the print angle such that layer direction matches the anticipated direction of load on the final part(s).

Still referring to FIG. 6, a design such as 614 may be sensitive to an external load. Under an applied load, a 3D part 616 built by a 3-axis printer may suffer from a delamination or even a fracture around certain weak area. One reason may be the fact that interlayer strength is typically lower than the strength within the layers. With the ability to change the print angle, the 5-axis printer can provide reinforcement to the 3D part by depositing additional conformal layers around the weak area, leading to a final part 618 with greater strength. In some embodiments, the inner layers are pre-heated in order to get better adhesion when printing the conforming layers.

One cost-saving application of 3D printing is the capability to produce parts at near-net shape. The progression toward final part geometry therefore typically requires machining operations to be performed on the part after printing has completed. Machining can be performed on a printed part within one of two logistical schemes: either in-situ operations are performed, where the machining volume coexists with the printing volume, or separate machining and printing volumes exist, and the part is transitioned between them. Both schemes develop serially, where the machining operation cannot begin until the printing operation has completed sufficiently.

Conventional post-processing of parts requires moving the part outside of the printing space into a separate post-processing space or through successive, in-situ print and post-processing operations within a shared space. Post-processing therefore requires greater logistical complexity and associated cost when moving parts out of the printing space and into a separate post-processing space, or increased machine complexity and associated cost for in-situ operations. The present disclosure describes a system and method to create separate process spaces for printing and post-processing at little added logistical or machine complexity.

Referring to FIGS. 3C and 3D, the 3D part being printed can move outside of the print volume 336 by sliding along the bed 322. In some embodiments, a machining operation can be added downstream, for example, in parallel.

Referring to FIGS. 7A and 7B, a print volume 702, bounding the possible location of an extruder assembly 704, abuts a separate volume 706 for a machining operation 708. This method works for both continuous operations as shown in FIG. 7A as well as batch operations as shown in FIG. 7B.

It is desirable during the course of a printing process to keep consistent inter-layer adhesion to prevent delamination of material. The adhesion between the first layer and the bed for conventional 3-axis printing is similarly important as delamination tends to propagate through the vertical dimension of the part and lead to failures. As the angle between the printing plane and build surface plane is varied the downward pressure normal to a horizontal build surface reduces. The present disclosure describes a system and method of using a shaped receiver for the first bead which allows a more consistent bead pressure and improves adhesion.

Referring to FIGS. 8A and 8B, the intersection of the build plane and the printing plane forms a line 806 where the first layer of an inclined print will be placed. Increasing the angle of inclination ζ of a printing plane 804 from a build plane 802 increases a volume of material τ 808 required to maintain a consistent contact area (Δy·Δx) 810 and thus consistent adhesion. An aspect of the invention, shown in FIG. 8B, places an initial line 816 upon some or all of internal radius 822 of an angled bar 816. This is to increase a contact area (Δy·Δx) 820 in proportion with an increased volume of material τ 818 required as angle of inclination ζ of a printing plane 814 is increased away from parallel with a build plane 812.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of printing a 3D part including at least one overhang or hollow section using a 3D printer, comprising:
   providing a gantry of the 3D printer;
   providing an extruder assembly of the 3D printer, wherein the extruder assembly is operably attached to the gantry, and wherein the extruder assembly is configured to print a material in a printing plane and the printing plane forms a first angle with a horizontal plane;
   determining an allowed maximum layer time and an allowed minimum layer time, at least in part, using a bead width and properties of the material;
   determining a layer time for the 3D part, the layer time depending on factors including i) a cross sectional area, in the printing plane, of the 3D part, ii) a print speed of the 3D printer, and iii) the bead width;
   rotating the extruder assembly so that the printing plane forms an adjusted angle with the horizontal plane, the adjusted angle increasing or decreasing the cross sectional area of the 3D part to be printed in such a way as to maintain the layer time between the allowed maximum layer time and the allowed minimum layer time; and
   depositing a layer of the material on a receiving surface, wherein the 3D part is printed without support material under the at least one overhang or hollow section.

2. The method of claim 1, wherein the first angle and the adjusted angle are different, optionally, wherein the first angle is between 0 and 90 degrees, optionally 45 degrees, and/or the adjusted angle is between 0 and 90 degrees, optionally 45 degrees.

3. The method of claim 1, wherein the properties of the material deposited comprise the melt temperature of the material.

4. The method of claim 1, wherein
   i) the receiving surface is movable, and/or
   ii) the receiving surface includes a flat belt, and/or
   iii) the receiving surface comprises a plurality of pulleys, and/or
   iv) the receiving surface is articulated to rotate away from parallel with a horizontal plane.

5. The method of claim 1, wherein the gantry offers a print volume with a first width and first height through which the part that exceeds the print volume is printed by gradually moving the part away from the print area.

6. The method of claim 1, wherein the receiving surface is a rigid member with a curved surface comprising:
   an angled bar with an internal radius; and
   a length spanning the width of the 3D printer's build volume in a first direction;
   wherein the cross-section of the rigid member is consistent along the first direction to increase the surface contact with material deposited by said 3D printer.

7. A method of printing a 3D part including at least one overhang or hollow section using a 3D printer, comprising:
   providing a gantry of the 3D printer;
   providing an extruder assembly of the 3D printer wherein the extruder assembly is operably attached to the gantry, wherein the extruder assembly comprises a nozzle and the nozzle is configured to print a material in a printing plane and the printing plane forms a first angle with a horizontal plane;
   determining an allowed maximum layer time and an allowed minimum layer time, at least in part, using a bead width and properties of the material;
   determining a layer time for the 3D part, the layer time depending on factors including i) a cross sectional area, in the printing plane, of the 3D part, ii) a print speed of the 3D printer, and iii) the bead width;
   rotating the nozzle so that the printing plane forms an adjusted angle with the horizontal plane, the adjusted angle increasing or decreasing the cross sectional area of the 3D part to be printed in such a way as to maintain the layer time between the allowed maximum layer time and the allowed minimum layer time; and
   depositing a material layer on a receiving surface, wherein the 3D part is printed without support material under the at least one overhang or hollow section.

8. The method of claim 7, wherein the first angle and adjusted angle are different, optionally, wherein the first angle is between 0 and 90 degrees, optionally 45 degrees, and/or the adjusted angle is between 0 and 90 degrees, optionally 45 degrees.

9. The method of claim 7, wherein the properties of the material deposited comprise a melt temperature of the material.

10. The method of claim 7, wherein
   i) the receiving surface is movable, and/or
   ii) the receiving surface includes a flat belt, and/or
   iii) the receiving surface comprises a plurality of pulleys, and/or
   iv) the receiving surface is articulated to rotate away from parallel with a horizontal plane.

11. The method of claim 7, wherein the gantry offers a print volume with a first width and first height through which the part that exceeds the print volume is printed by gradually moving the part away from the print area.

12. The method of claim 7, wherein the receiving surface is a rigid member with a curved surface comprising:
- an angled bar with an internal radius; and
- a length spanning the width of the 3D printer's build volume in a first direction;
- wherein the cross-section of the rigid member is consistent along the first direction to increase the surface contact with material deposited by said 3D printer.

13. The method of claim 1, wherein the properties of the material deposited comprise a glass transition temperature of the material.

14. The method of claim 5, wherein the extension of the part volume beyond the print volume drives the parallel post-processing of the part by means of a separate working volume into which the part enters and machining operations are executed.

15. The method of claim 7, wherein the properties of the material deposited comprise a glass transition temperature of the material.

16. The method of claim 11, wherein the extension of the part volume beyond the print volume drives the parallel post-processing of the part by means of a separate working volume into which the part enters and machining operations are executed.

* * * * *